Figure 1:
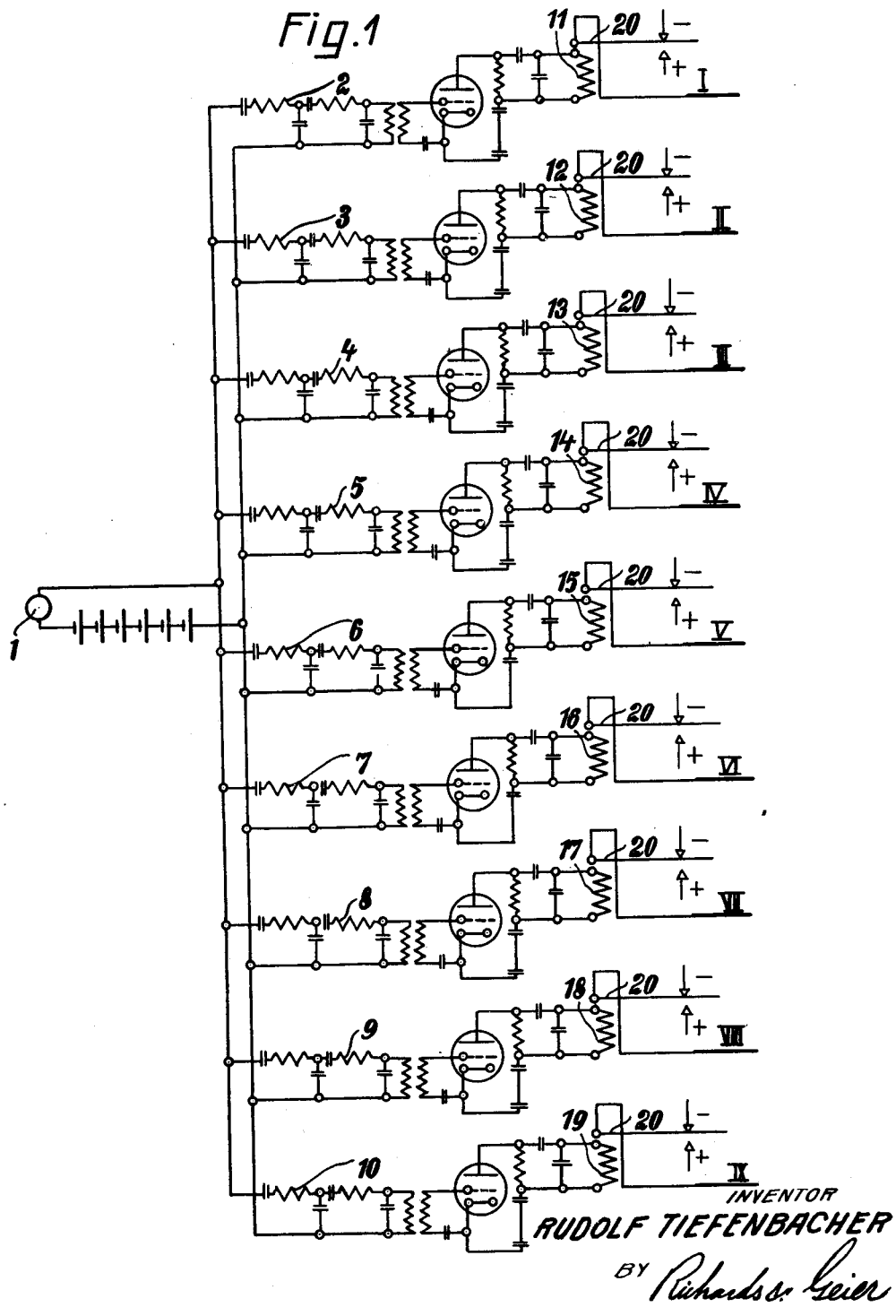

March 20, 1934.  R. TIEFENBACHER  1,951,454
METHOD FOR THE REPRESENTATION IN PRINT OF SPOKEN SOUNDS
Filed Oct. 4, 1930  4 Sheets-Sheet 2

Fig. 2

INVENTOR
RUDOLF TIEFENBACHER
BY
ATTORNEYS

March 20, 1934.　　　　R. TIEFENBACHER　　　　1,951,454
METHOD FOR THE REPRESENTATION IN PRINT OF SPOKEN SOUNDS
Filed Oct. 4, 1930　　　4 Sheets-Sheet 3

Fig.3

March 20, 1934.  R. TIEFENBACHER  1,951,454
METHOD FOR THE REPRESENTATION IN PRINT OF SPOKEN SOUNDS
Filed Oct. 4, 1930  4 Sheets-Sheet 4

Fig. 4

| | I | II | III | IV | V | VI | VII | VIII | IX |
|---|---|---|---|---|---|---|---|---|---|
| u | + | − | − | − | − | − | − | − | − |
| o | + | + | − | − | − | − | − | − | − |
| a | − | + | + | + | − | − | − | − | − |
| ö | + | + | − | − | + | + | − | − | − |
| ä | − | + | + | − | + | + | − | − | − |
| ü | + | − | − | − | − | + | + | − | − |
| e | + | + | − | − | − | + | + | − | − |
| i | + | − | − | − | − | + | + | + | − |
| r | − | − | + | + | + | − | − | − | − |
| k | + | − | − | + | + | + | − | − | − |
| ch | − | − | − | + | + | − | + | + | − |
| h | − | − | − | + | + | − | − | − | − |
| sch | − | − | − | − | + | + | − | − | − |
| ngn | − | − | − | − | − | + | + | − | − |
| m | − | − | − | + | − | + | + | − | − |
| l | − | + | − | − | − | + | + | − | − |
| s | − | − | − | − | − | + | + | + | + |
| f | − | − | − | − | − | + | + | + | − |

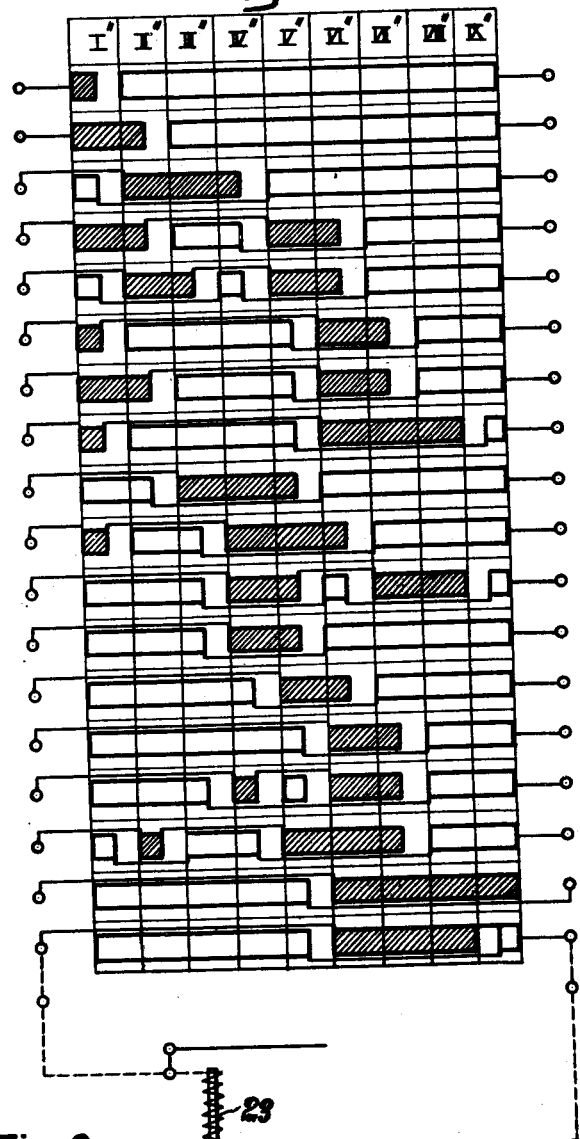

Fig. 5

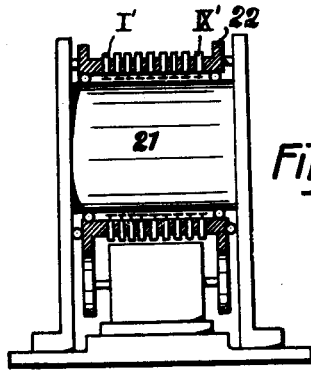

Fig. 6

INVENTOR
RUDOLF TIEFENBACHER
BY Richards & Geier
ATTORNEYS

Patented Mar. 20, 1934

1,951,454

UNITED STATES PATENT OFFICE 1,951,454

METHOD FOR THE REPRESENTATION IN PRINT OF SPOKEN SOUNDS

Rudolf Tiefenbacher, Essen, Germany

Application October 4, 1930, Serial No. 486,346
In Germany January 16, 1930

5 Claims. (Cl. 178—31)

The subject of this application is a method and means for translating spoken sounds into printed words.

According to a well known theory one or several close characteristic sound range formants which are absolutely fixed in their height, correspond to each sound of a vowel. The branch tone of the sound formation, falling into these sound ranges, determines the sound of the vowel and effects that the human ear feels the sound as the respective vowel. Modern research proved the most important physical determination of a sound of speech is the association of one or several of such formants. According to the numerous fundamentally concurring researches, the formants of the separate sounds of speech are fixed. At several occasions sounds of speech were formed synthetically by means of those formants.

According to the method of this application, these ranges of branch tones or formants are used for the representation in print of the sounds of speech: the sounds, respectively the mixture of alternating current frequencies formed by them in a microphone is subdivided into separate components, which correspond to the sound formants, by means of the filter chains as they are used in the tone frequency telegraphy. Each one of the applied filter chains is permeable only for one certain range of frequency, each sound of speech influencing one or several filter chains. The separate filter chains set to work relays connected in series—which can be either special A. C. reception relays or, after rectification of the speech currents behind the filter chains, suitable direct current relays; the armature of these relays connects in case of non-responding of a filter chain (no current), the proper bus-bar with the negative pole of a source of currents; but as soon as a wave trace goes through the filter chain, the armature is shifted and it connects the proper bus-bar with the positive pole of the same source of current. After the finishing of a wave trace in the filter chain the armature of the relay goes back from the closed to the open circuit contact.

It is possible to substitute specially designed directly responding frequency relays for the elements consisting of filter chain, rectifier and D. C. relay.

The speech sounds transformed by subdivision into a combination of plus and minus currents, are translated in a suitable apparatus, and are then represented in print in a printing apparatus, in a way similar to that applied in type printing telegraphy.

According to this invention means are provided for preventing the repeated printing of the same speech sound, said means operating in such a manner that, if the relay is once in closed position, the current for printing the letter for the respective speech sound can be sent into the printing apparatus only once, a second flow of the current being possible only after the reopening of the relay.

Accordingly, every speech sound is subdivided into components, transformed into a combination of plus and minus currents, translated in a suitable apparatus, and then represented in print, either strip or sheet print, in a printing apparatus.

The novelty of the present invention lies in the combination of the sound subdivision into components corresponding to the sound formants by means of electric filters, with a method of reproduction—similar to that used in type print telegraphy—for the representation of spoken sounds in print, made possible by the transformation of the sound components into a combination of plus and minus currents.

In the attached drawings the subject of the method in question is illustrated by an example. The drawings represent:

Fig. 1, the diagram of connection for the decomposition of the mixture of A. C. frequencies behind the microphone into ranges of frequencies corresponding to the sound formants or components, Fig. 2, the diagram of sound formants, Fig. 3, the diagram of the necessary electric filters, Fig. 4, the diagram of the signs of speech sounds, represented by a combination of plus and minus currents, Fig. 5, the arrangement of the segments of the commutator, which is used as apparatus for transposition (development), Fig. 6, a section through the stationary commutator, as it is used in sheet print, in connection with a rotating slip drum.

In the drawings Fig. 2 shows a diagram of soundless vowels and consonants prepared by Stumpf and described on page 107 of his book "Die Sprachlaute", Berlin, 1926. In Fig. 2 the full lines represent the true sound-formants together with the auxiliary formants, while the broken lines represent ranges of additional tones which may improve the tone of a sound but are of secondary importance for its specific character. The crosses represent characteristic frequencies of the whispered speech sounds.

Fig. 3 shows diagrammatically the way in which the sound-formants are subdivided into various ranges of branch tones I to IX which represent the specific sound components. Said components may be combined in many different ways to produce the sound formants. The ranges of branch tones I to IX determine the number and the range of frequencies of the required filter chains I to IX. These filter chains are influenced by the sound components and transform them into corresponding combinations of positive and negative currents.

As shown in Fig. 1, the device for decomposing a sound into its components consists of the microphone (1) and of the filter-chains (2—10), corresponding to the different formant ranges. The D. C. impulse relays (11—19) are connected in series to the filter chains and are set to work by the wave traces running through the filter-chains. In open position the armatures of these relays are connected with the negative pole of a source of current; at the responding of a filter chain they are attracted by the trip coil magnet and switched to the plus pole of the source of current. In one case a minus current is led in the bus-bars (I—IX), electrically connected with the relay armatures, in the other case a plus current is led to said bus-bars. Every spoken sound makes one or several relays respond; this effects a combination of plus and minus currents in the bus-bars (I—IX), and by means of the translating commutator (21) the printing of the sign of the respective speech sound.

The several segments fixed on the circumference of the commutator are connected with the printing magnet of the strip printer, or (in the case of sheet print) they are connected electrically with the electro-magnet (23) of the trip gear of a typewriter, which is equipped with an automatic return of carriage and line feed. In the latter case, for the sake of a plainer deduction of the current, the commutator is built stationary, and a rotating slip-drum (22) with insulated rings (I'—IX') (Fig. 6) is used for connecting it with the bus-bars (I—IX); in the first case the rotating commutator which bears the type wheel on its axle slides on the bus-bars (I—IX). All connecting wires of the segments connect the source of current with the printing magnet (23) which presses at the release of its armature, a roll against the type wheel and thus prints the just opposite type of the type wheel on the passing-by paper strip, said connection taking place by means of two brushes.

The number of revolutions of the commutator, respectively of the slip-drum must be chosen in such a way that one revolution does not take more time than the speech sound of the shortest duration.

The mode of operation of the commutator working as translation apparatus is the same in principle in both cases. At every revolution the segments have to make an electrical connection between the source of current and the printing apparatus of the strip printer, and also between said source and several release magnets of the sheet-printer by means of the bus-bars (I—IX). In strip-printing the induction of the printing magnet (23) takes place at the moment when the type just opposite the magnet of the type wheel rotating with the commutator corresponds to the just fixed combination of plus and minus currents, respectively with the speech sound belonging to this combination.

For example the process for the printing of the sound "e" is as follows: According to diagram Fig. 3, the sound "e" corresponding to its formants I, II, VI, VII, makes respond the filter chains 2, 3, 7, 8, therefore switches the armatures of the relays 11, 12, 16 and 17 from the minus to the plus pole of the source of current, so that a combination of plus and minus currents takes place in the bus-bars I—IX, in which bars I, II, VI, VII lead a plus current and bars III, IV, V, VIII, IX lead a minus current. An electrical connection between the source of current and the printing magnet, respectively the release magnet will take place only in that single moment in which a certain segment of the commutator is situated opposite the bus-bars I—IX; this segment has the fields I", II", VI", VII" connected with the fields III", IV", V", VIII" and IX" in such a way that both connecting wires permit the current to flow to the magnets. At this position of the relays, every other segment prevents the flow of the current to the magnets, because of the different distribution of its fields.

Having now particularly described and ascertained the nature of my said invention and in what manner the same is to be performed, I declare that what I claim is:—

1. A method of translating spoken sounds into printed words, comprising the steps of transforming the individual sounds of speech and the combinations of integral sound formants, absolutely fixed in their height, for every speech sound different from every other combination, into corresponding combinations of plus and minus currents, in translating said combinations of plus and minus currents into actuating impulses and in actuating therethru a printing apparatus.

2. An apparatus for translating spoken sounds into printed words, comprising transforming elements, each element comprising a common microphone, which receives and transforms the sound waves into electrical waves, filter chains, each of said chains corresponding to a single sound formant, said chains representing combinations of sound formants, direct current relays, each of said relays being actuated through the proper filter chain respectively through the sound formant belonging hereto, and bus-bars, each bus-bar being connected in case of a non-responding filter chain with the negative pole of a source of current, but as soon as a trace goes through the filter chain, with the positive pole of the same source of current, and a printing apparatus, the combinations of plus and minus currents being translated into actuating impulses for said printing apparatus.

3. An apparatus for translating spoken sounds into printed words, comprising transforming elements, each of said elements comprising a common microphone, which receives and transforms the sound waves into electrical waves, filter chains, each of said chains corresponding to a single sound formant, said chains representing combinations of sound formants, alternating current relays, each of said relays being actuated through the proper filter chain respectively through the sound formant belonging hereto, and bus-bars, each bus-bar being connected in case of nonresponding filter chain with the negative pole of a source of current, but as soon as a trace goes through the filter chain, with the positive pole of the same source of current, and a printing apparatus, the combinations of plus and minus currents being translated into actuating impulses for said printing apparatus.

4. Transforming elements for translating spoken sounds into printed words, each of said elements comprising a common microphone, which receives and transforms the sound waves into electrical waves, directly responding frequency relays, each of said relays corresponding to a single formant and energized directly therethrough, said relays representing combinations of sound formants, and bus-bars, each of said bus-bars being connected in case of a nonresponding frequency relay with the negative pole of a source of current, but as soon as a trace goes through the frequency relay, with the positive pole of the same source of current.

5. A method of translating spoken sounds into printed words, comprising the steps of transforming the individual sounds of speech and the combinations of integral sound formants of said individual speech sounds into corresponding combinations of plus and minus currents, said speech sounds being projected upon a microphone coupled with a transforming apparatus, translating said combinations of plus and minus currents into actuating impulses, and actuating therethru a printing apparatus.

RUDOLF TIEFENBACHER.